(12) United States Patent
Yoshida et al.

(10) Patent No.: US 7,692,432 B2
(45) Date of Patent: Apr. 6, 2010

(54) LIQUID PROPERTY SENSOR

(75) Inventors: Takahiko Yoshida, Okazaki (JP); Minoru Murata, Obu (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 11/907,005

(22) Filed: Oct. 9, 2007

(65) Prior Publication Data
US 2008/0100309 A1 May 1, 2008

(30) Foreign Application Priority Data
Oct. 27, 2006 (JP) ............................. 2006-293031

(51) Int. Cl.
*G01R 27/26* (2006.01)
(52) U.S. Cl. ...................... 324/663; 324/690
(58) Field of Classification Search .................. 324/663, 324/690
See application file for complete search history.

(56) References Cited

U.S. PATENT DOCUMENTS 5,367,264 A    11/1994   Brabetz
6,167,761 B1 *  1/2001  Hanzawa et al. ............... 73/724
6,781,388 B2 *  8/2004  Wang et al. ................. 324/690
2006/0037393 A1  2/2006  Itakura et al.

FOREIGN PATENT DOCUMENTS

| JP | A-4-350550 | 12/1992 |
| JP | A-2002-340830 | 11/2002 |
| JP | A-2005-201670 | 7/2005 |

* cited by examiner

*Primary Examiner*—Vincent Q Nguyen
(74) *Attorney, Agent, or Firm*—Posz Law Group, PLC

(57) ABSTRACT

A liquid property sensor for detecting property of liquid includes a semiconductor board, a first electrode and a second electrode, and a protection film. The first and second electrodes are disposed on the semiconductor board to be spaced from each other at a predetermined distance. The protection film has resistance relative to the liquid, and is exposed to the liquid. The first and second electrodes detect a capacitance therebetween as the property of the liquid in accordance with a relative permittivity of the liquid. A capacitance-voltage conversion circuit of the semiconductor board converts the capacitance into a voltage value.

10 Claims, 3 Drawing Sheets

# LIQUID PROPERTY SENSOR

CROSS REFERENCE TO RELATED APPLICATION

This application is based on Japanese Patent Application No. 2006-293031 filed on Oct. 27, 2006, the disclosure of which is incorporated herein by reference in its entirety.

BACKGROUND OF THE INVENTION

1. Field of the Invention

The present invention relates to a liquid property sensor.

2. Description of Related Art

Due to a soaring cost of fossil fuel, or for environmental protection, alcohol-blended fuel is getting to be widely used. The alcohol-blended fuel is produced by mixing alcohol into automotive fuel such as gasoline. When the alcohol-blended fuel is used, optimum combustion condition is varied in accordance with a mixture ratio between the alcohol and the gasoline. Therefore, in order to improve combustion efficiency, the mixture ratio between the alcohol and the gasoline needs to be detected in advance.

U.S. Pat. No. 5,367,264 (corresponding to JP-A-5-507561) discloses a detector for detecting alcohol content contained in air-fuel mixture by measuring a capacitance and a conductance of a capacitor. The detector includes a casing and a sensor element. The casing of the detector has a passage through which the air-fuel mixture passes, and the sensor element of the detector is exposed to the air-fuel mixture passing through the passage. The sensor element is arranged to be thermally and electrically insulated from the casing. The capacitor includes a first electrode made of a part of a wall of the casing, and a second electrode made of the sensor element exposed to flow of the air-fuel mixture.

A size of the above-described detector typically becomes large, so that an arrangement of the detector may become difficult. Further, the passage of the casing is complexly bending, and the sensor element is inserted into the passage with a predetermined clearance between an inner wall of the passage and the sensor element. Therefore, clogging of a foreign object may be easily generated.

SUMMARY OF THE INVENTION

In view of the foregoing and other problems, it is an object of the present invention to provide a liquid property sensor.

According to an example of the present invention, a liquid property sensor for detecting property of liquid includes a semiconductor board, a first electrode and a second electrode, and a protection film. The semiconductor board includes an insulation film disposed on a face of the semiconductor board, and a signal processing circuit having a capacitance-voltage conversion circuit. The first and second electrodes are disposed on the face of the semiconductor board to be spaced from each other at a predetermined distance. The protection film is disposed on the semiconductor board to cover the face of the semiconductor board, on which the first and second electrodes are disposed. The protection film has resistance relative to the liquid, and is exposed to the liquid. The first and second electrodes detect a capacitance therebetween as the property of the liquid in accordance with a relative permittivity of the liquid. The capacitance-voltage conversion circuit converts the capacitance between the first and second electrodes into a voltage value.

Accordingly, a size of the liquid property sensor can be reduced, and the liquid property sensor can stably detect a liquid property.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
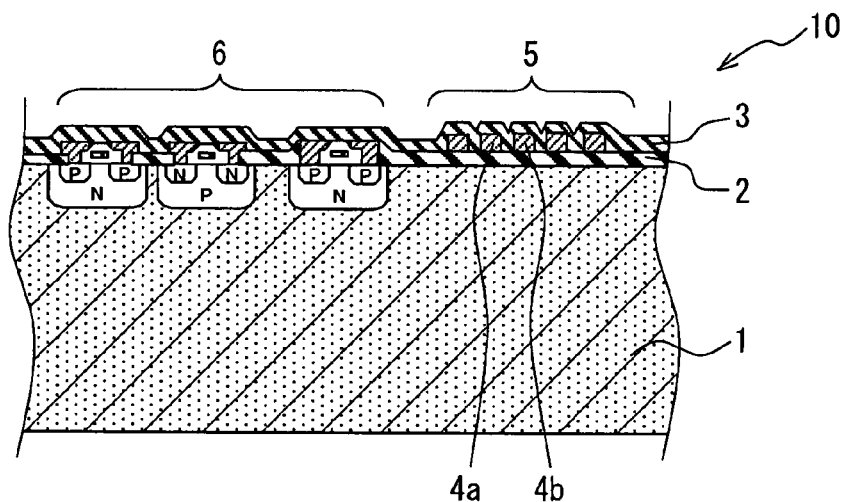
FIG. 1 is a schematic cross-sectional view showing a liquid property sensor according to a first embodiment of the present invention.

A liquid property sensor 10 shown in FIG. 1 is used for detecting a mixture ratio between gasoline and alcohol by measuring relative permittivity of alcohol-blended gasoline. A semiconductor board 1 of the liquid property sensor 10 is made of silicon, for example. The semiconductor board 1 has a measurement part 5 and a circuit element part 6 thereon. The measurement part 5 measures a capacitance, which corresponds to the relative permittivity of the alcohol-blended gasoline. The circuit element part 6 has a variety of circuit elements for performing signal processing relative to an output from the measurement part 5.

Figure 2:
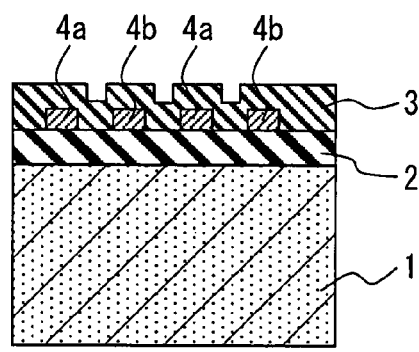
FIG. 2 is a schematic enlarged cross-sectional view showing a measurement part of the liquid property sensor.

As shown in FIG. 2, an insulation film 2 made of silicon oxide film is arranged on a face of the semiconductor board 1. A first electrode 4a and a second electrode 4b paired with the first electrode 4a are arranged on the insulation film 2 to face each other, and spaced from each other at a predetermined distance. Each of the electrodes 4a, 4b has a common electrode and plural comb-teeth electrodes extending from the common electrode in a predetermined single direction. The electrodes 4a, 4b are arranged such that the comb-teeth electrodes of the electrodes 4a, 4b are alternately arranged. Because the electrode 4a, 4b has the comb-teeth shape, an arrangement area of the electrode 4a, 4b can be reduced, and an opposing area between the electrodes 4a, 4b can be increased. However, the electrode 4a, 4b may have any shape without departing from the scope of the present disclosure.

The electrode 4a, 4b is produced by applying a metal material, e.g., aluminum, copper, chromium, gold or platinum, on the semiconductor board 1 with sputtering, and patterning the applied metal material into the comb-teeth shape with photolithography, for example. Alternatively, the electrode 4a, 4b may be made of a conductive non-metal material, e.g., polysilicon.`

A silicon nitride film is formed to cover the electrodes 4a, 4b and the semiconductor board 1 as a protection film 3. The protection film 3 is deposited on the semiconductor board 1 to have an approximately uniform thickness, e.g., 10 μm, with a plasma chemical vapor deposition (CVD) or sputtering. Alternatively, a silicon oxide film may be used as the protection film 3. The silicon nitride film or the silicon oxide film has better resistance relative to liquid, e.g., gasoline, alcohol or oil, to be detected by the liquid property sensor 10. Further, the silicon nitride film or the silicon oxide film can be easily produced by an ordinary semiconductor manufacturing technology.

The liquid property sensor 10 is arranged such that the protection film 3 is exposed to the alcohol-blended gasoline, and the relative permittivity of the alcohol-blended gasoline is detected by the liquid property sensor 10. Thereby, a capacitor is formed between the electrodes 4a, 4b, and the capacitor has a dielectric constructed with the protection film 3 and the alcohol-blended gasoline adjacent to a surface of the protection film 3. Therefore, a capacitance of the capacitor formed between the electrodes 4a, 4b can be measured, and the capacitance corresponds to the relative permittivity of the alcohol-blended gasoline adjacent to the surface of the protection film 3, in addition to the relative permittivity of the protection film 3.

Figure 3:
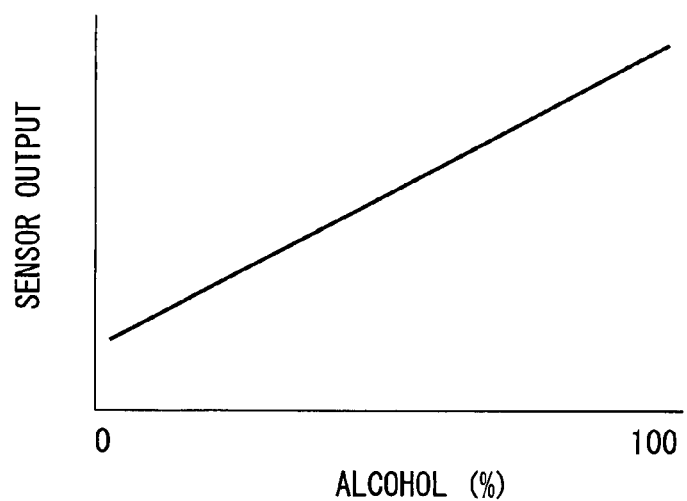
FIG. 3 is a graph showing a relationship between an alcohol ratio and an output of the liquid property sensor.

Here, the relative permittivity of the alcohol-blended gasoline is changed in accordance with the mixture ratio between the gasoline and the alcohol. The relative permittivity of the gasoline is in a range from three to four, and the relative permittivity of the alcohol is in a range from twenty to thirty. Therefore, the mixture ratio between the gasoline and the alcohol can be detected by measuring the capacitance between the electrodes 4a, 4b. For example, as shown in FIG. 3, a relationship between an alcohol ratio (the mixture ratio between the gasoline and the alcohol) and output (the capacitance between the electrodes 4a, 4b) of the liquid property sensor 10 has been measured in advance to be stored, so that a mixture ratio to be detected can be provided from a measured capacitance.

However, the relative permittivity of the gasoline or the alcohol is varied in accordance with temperature. Therefore, temperature of the alcohol-blended gasoline is to be detected, and the above relationship used for calculating the mixture ratio is to be corrected based on the detected temperature. Alternatively, the relationship between the alcohol ratio and the capacitance may be measured at each temperature in advance, and an appropriate relationship is to be selected based on the detected temperature.

In addition, as a difference of the relative permittivity between the protection film 3 and the alcohol-blended gasoline is increased, it becomes difficult for an electric field between the electrodes 4a, 4b to expand from the protection film 3 toward the alcohol-blended gasoline. When the electric field is restricted from expanding from the protection film 3 toward the alcohol-blended gasoline, variation of the capacitance between the electrodes 4a, 4b caused by the relative permittivity of the alcohol-blended gasoline becomes smaller. In this case, detection sensitivity may be lowered. Therefore, in order to reduce the difference of the relative permittivity between the protection film 3 and the alcohol-blended gasoline, the relative permittivity of the protection film 3 may be in a variation range of the relative permittivity of the alcohol-blended gasoline.

In this embodiment, the silicon nitride film or the silicon oxide film is used as the protection film 3. The silicon nitride film has the relative permittivity of about seven, and the silicon oxide film has the relative permittivity of about four. That is, the relative permittivity of the silicon nitride film or the silicon oxide film is in the variation range of the relative permittivity of the alcohol-blended gasoline. Therefore, the relative permittivity of the alcohol-blended gasoline can be accurately detected.

Further, as a thickness of the protection film 3 is increased, it becomes difficult for the electric field between the electrodes 4a, 4b to reach the alcohol-blended gasoline adjacent to the surface of the protection film 3. In this case, the detection sensitivity may be lowered. Therefore, the thickness of the protection film 3 may be made equal to or smaller than 10 μm.

The circuit element part 6 shown in FIG. 1 is constructed with elements, e.g., CMOS transistors and capacitors, and these elements construct a capacitance-voltage (C-V) conversion circuit, a sample hold circuit or an amplification circuit. The C-V conversion circuit converts the capacitance between the electrodes 4a, 4b measured by the measurement part 5 into a voltage value. The sample hold circuit samples and holds the converted voltage for a predetermined period. The amplification circuit amplifies voltage output from the sample hold circuit.

Thus, this semiconductor type sensor is used as the liquid property sensor 10. Further, a signal processing circuit for processing output from the measurement part 5 is integrally constructed with the liquid property sensor 10. Therefore, size of the liquid property sensor 10 can be much reduced.

The liquid property sensor 10 is arranged in a fuel pipe disposed between a fuel pump and an injector for a vehicle, for example. Because the size of the liquid property sensor 10 is easily reduced, the liquid property sensor 10 can be freely arranged in the fuel pipe.

Figure 4A:
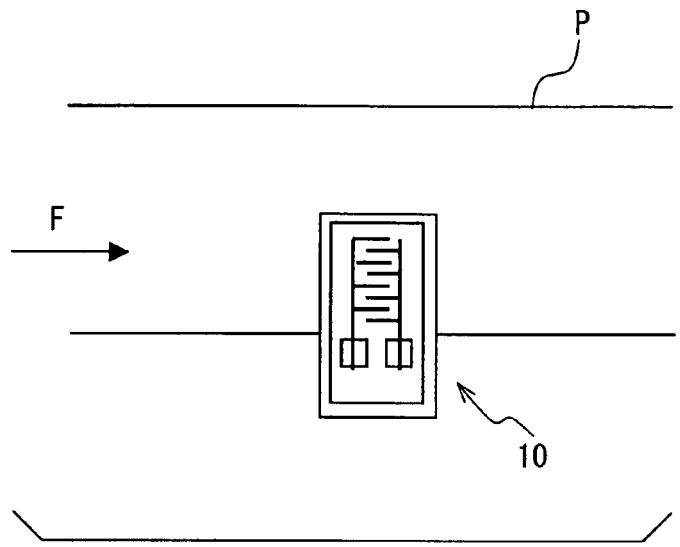
FIGS. 4A and 4B are schematic diagrams for explaining an arrangement of the liquid property sensor in a fuel pipe.
Figure 4B:
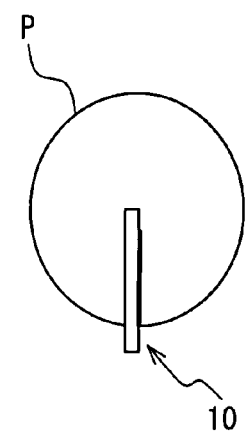

Here, when the liquid property sensor 10 is disposed in the fuel pipe, the liquid property sensor 10 is arranged such that fuel can smoothly flow from the fuel pump toward the injector. As shown in FIGS. 4A and 4B, a part of the liquid property sensor 10 is inserted into a fuel pipe P. Thus, a board surface having the measurement part 5 of the semiconductor board 10 is approximately parallel to a fuel flow F, and the measurement part 5 protrudes into the fuel pipe P.

Figure 5A:
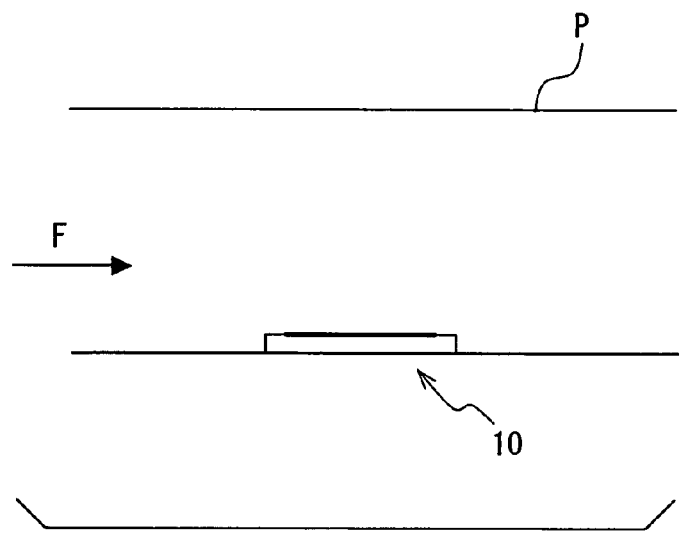
FIGS. 5A and 5B are schematic diagrams for explaining another arrangement of the liquid property sensor in the fuel pipe.
Figure 5B:
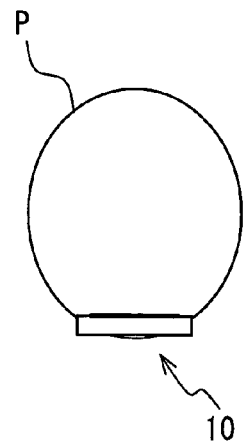

Alternatively, as shown in FIGS. 5A and 5B, the liquid property sensor 10 is mounted to the fuel pipe P such that a part of an inner surface of the fuel pipe P corresponds to the board surface having the measurement part 5 of the semiconductor board 10. Thereby, the alcohol-blended gasoline flowing in the fuel pipe P flows along the board surface of the liquid property sensor 10, so that the alcohol-blended gasoline can smoothly flow, when the liquid property sensor 10 is disposed in the fuel pipe P.

According to the first embodiment, the liquid property sensor 10 has a simple construction constructed by layering the semiconductor board 1, the electrodes 4a, 4b and the protection film 3. Therefore, size of the liquid property sensor 10 can be easily reduced. Further, the protection film 3 has resistance relative to liquid to be detected, and a surface of the protection film 3 is exposed to the liquid. Thereby, any passage for the liquid is not provided in the liquid property sensor 10. Thus, clogging is not generated in the liquid property sensor 10.

Second Embodiment

As above described, as the difference of the relative permittivity between the protection film 3 and the alcohol-blended gasoline is increased, the variation of the capacitance between the electrodes 4a, 4b caused by the relative permittivity of the alcohol-blended gasoline becomes smaller. That is, in a case where the relative permittivity of the alcohol-blended gasoline is entirely changed over its variation range, if the relative permittivity of the protection film 3 has a uniform value (if the protection film 3 of the liquid property sensor 10 is made of a single film), the detection sensitivity may be lowered.

However, in a second embodiment, a liquid property sensor 10 includes a plurality of the protection films 3 having different relative permittivities, and the first and second electrodes 4a, 4b are correspondingly provided to each of the protection films 3.

When the relative permittivity of the alcohol-blended gasoline is entirely changed over its variation range, a difference of the relative permittivity between the protection film 3 and the alcohol-blended gasoline is calculated, and the calculated differences are compared among the plurality of the protection films 3. Then, a protection film having the smallest difference is selected as the protection film 3, and the electrodes 4a, 4b corresponding to the selected protection film provides the capacitance as a liquid property. Thus, sensitivity for detecting the variation of the relative permittivity of the alcohol-blended gasoline can be made better.

Figure 6:
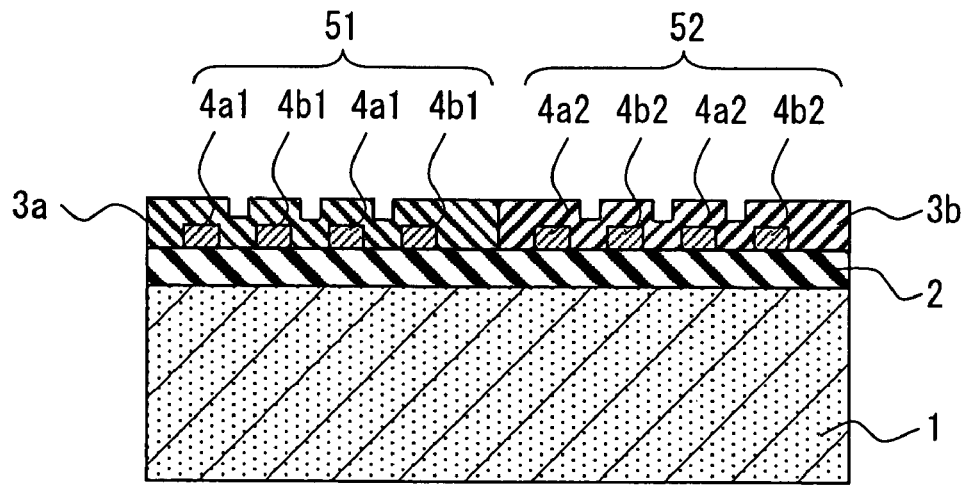
FIG. 6 is a schematic enlarged cross-sectional view showing measurement parts of a liquid property sensor according to a second embodiment of the present invention.

As shown in FIG. 6, for example, the liquid property sensor 10 of the second embodiment includes a first protection film 3a and a second protection film 3b, and the relative permittivities of the protection films 3a, 3b are different from each other. The protection film 3a, 3b is made of silicon nitride film or silicon oxide film, similarly to the first embodiment.

In this case, for example, the first protection film 3a has the relative permittivity equal to or smaller than five, which is approximately equal to the relative permittivity of the gasoline. In contrast, the second protection film 3b has the relative permittivity equal to or lager than twenty, which is approximately equal to the relative permittivity of the alcohol.

A first pair of electrodes 4a1, 4b1 is arranged corresponding to the first protection film 3a, and a second pair of electrodes 4a2, 4b2 is arranged corresponding to the second protection film 3b. Thus, a first measurement part 51 is constructed with the first protection film 3a and the first pair of electrodes 4a1, 4b1, and a second measurement part 52 is constructed with the second protection film 3b and the second pair of electrodes 4a2, 4b2. The first measurement part 51 and the second measurement part 52 are arranged on the semiconductor board 1 through the insulation film 2.

Here, the relative permittivity of the protection film 3a, 3b is increased when phosphorus or boron is added by using an ion implantation method. Further, the relative permittivity of the protection film 3a, 3b is decreased when a composition of the protection film 3a, 3b is made to be sparse by adjusting temperature or vacuum degree, in a case where the protection film 3a, 3b is produced by a chemical vapor deposition (CVD) method or sputtering. Thus, the protection film 3a, 3b is produced to have a predetermined relative permittivity.

According to the second embodiment, if a ratio of the alcohol to the alcohol-blended gasoline is changed from 0% to 100%, the capacitance corresponding to the relative permittivity of the alcohol-blended gasoline can be accurately detected. That is, the mixture ratio between the alcohol and the gasoline can be accurately detected in both cases when the alcohol is a main part of the alcohol-blended gasoline and when the gasoline is a main part of the alcohol-blended gasoline.

Figure 7:
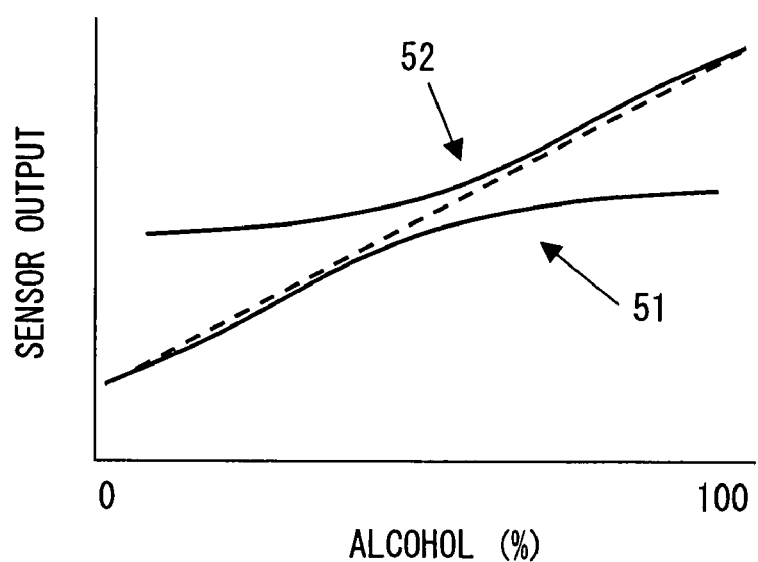
FIG. 7 is a graph showing a relationship between an alcohol ratio and an output of the liquid property sensor of the second embodiment.

As shown in FIG. 7, when the ratio of the alcohol is small (i.e., when the ratio of the gasoline is large), the relative permittivity of the alcohol-blended gasoline is relatively small. Therefore, the mixture ratio between the alcohol and the gasoline is detected by using output from the first measurement part 51, because the first measurement part 51 has a better detection sensitivity in this range. In contrast, when the ratio of the alcohol is large (i.e., when the ratio of the gasoline is small), the relative permittivity of the alcohol-blended gasoline is relatively large. Therefore, the mixture ratio between the alcohol and the gasoline is detected by using output from the second measurement part 52, because the second measurement part 52 has a better detection sensitivity in this range.

Further, when the relative permittivities of the protection films 3a, 3b are in the variation range of the alcohol-blended gasoline, detection accuracy can be better, because the difference of the relative permittivity between the protection film 3a, 3b and the alcohol-blended gasoline is small, as described in the first embodiment.

The first and second protection films 3a, 3b having different relative permittivities are arranged in the liquid property sensor 10 in FIG. 6. However, three or more protection films may be arranged in the liquid property sensor 10.

In the above embodiments, the liquid property sensor 10 is used for detecting the mixture ratio of the alcohol-blended gasoline. However, the liquid property sensor 10 may be used for detecting other liquid properties.

For example, when an alcohol-blended light oil is used as a diesel engine fuel, a mixture ratio between alcohol and light oil can be similarly detected. Further, a degradation level of engine oil can be detected, because the engine oil deteriorates due to oxidation and because the relative permittivity of the engine oil is changed in accordance with the degradation (oxidation) level.

Such changes and modifications are to be understood as being within the scope of the present invention as defined by the appended claims.

What is claimed is:

1. A liquid property sensor for detecting property of liquid, the liquid property sensor comprising:
   a semiconductor board including
      an insulation film disposed on a face of the semiconductor board, and
      a signal processing circuit having a capacitance-voltage conversion circuit;
   a first electrode and a second electrode, which are disposed on the face of the semiconductor board to be spaced from each other at a predetermined distance; and
   a protection film disposed on the semiconductor board to cover the face of the semiconductor board, on which the first and second electrodes are disposed, the protection film having resistance relative to the liquid, and the protection film being exposed to the liquid, wherein
   the first and second electrodes detect a capacitance therebetween as the property of the liquid in accordance with a relative permittivity of the liquid, and
   the capacitance-voltage conversion circuit converts the capacitance between the first and second electrodes into a voltage value.

2. The liquid property sensor according to claim 1, wherein the protection film has a relative permittivity, which is in a variation range of the relative permittivity of the liquid.

3. The liquid property sensor according to claim 1, wherein the protection film is constructed with a plurality of films having different relative permittivities in the variation range of the relative permittivity of the liquid, and the first and second electrode are correspondingly provided to each of the plurality of films.

4. The liquid property sensor according to claim 1, wherein the liquid is a mixture liquid constructed with a first liquid and a second liquid, the liquid has the relative permittivity, which changes in accordance with a mixture ratio between the first liquid and the second liquid, the protection film includes a first film having a relative permittivity approximately equal to a relative permittivity of the first liquid, and a second film having a relative permittivity approximately equal to a relative permittivity of the second liquid, and the first and second electrodes are correspondingly provided to each of the first film and the second film.

5. The liquid property sensor according to claim 1, wherein the protection film is made of one of a silicon oxide film and a silicon nitride film.

6. The liquid property sensor according to claim 1, wherein the protection film has a thickness equal to or smaller than 10 μm.

7. The liquid property sensor according to claim 1, wherein each of the first electrode and the second electrode is constructed with a common electrode and a plurality of comb-teeth electrodes extending from the common electrode in a predetermined single direction, and the first and second electrodes are arranged such that the comb-teeth electrode of the first electrode and the comb-teeth electrode of the second electrode are alternately arranged.

8. The liquid property sensor according to claim 1, wherein the semiconductor board is arranged such that the liquid flows along the face of the semiconductor board.

9. The liquid property sensor according to claim 1, wherein the liquid is an alcohol-blended automotive fuel, the alcohol-blended automotive fuel has a relative permittivity, which is changed in accordance with a mixture ratio between alcohol and automotive fuel, and the capacitance between the first and second electrodes corresponds to a composition ratio of the alcohol-blended automotive fuel.

10. The liquid property sensor according to claim 1, wherein the liquid is an engine oil, the engine oil has a relative permittivity, which is changed in accordance with a degradation level of the engine oil, and the capacitance between the first and second electrodes corresponds to the degradation level of the engine oil.

* * * * *